(12) United States Patent
Shi et al.

(10) Patent No.: US 11,133,554 B2
(45) Date of Patent: Sep. 28, 2021

(54) BATTERY PACK AND VEHICLE

(71) Applicant: Contemporary Amperex Technlogy Co., Limited, Fujian (CN)

(72) Inventors: Dongyang Shi, Zhangwan (CN); Xingdi Chen, Zhangwan (CN); Linggang Zhou, Zhangwan (CN); Peng Wang, Zhangwan (CN); Yongshou Lin, Zhangwan (CN); Yanhuo Xiang, Zhangwan (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 224 days.

(21) Appl. No.: 16/528,764

(22) Filed: Aug. 1, 2019

(65) Prior Publication Data
US 2020/0212385 A1    Jul. 2, 2020

(30) Foreign Application Priority Data

Dec. 30, 2018   (CN) .......................... 201811649786.4

(51) Int. Cl.
| | | |
|---|---|---|
| *H01M 50/20* | (2021.01) | |
| *H01M 50/54* | (2021.01) | |
| *B60L 50/60* | (2019.01) | |
| *B60K 1/04* | (2019.01) | |

(Continued)

(52) U.S. Cl.
CPC ............... *H01M 50/20* (2021.01); *B60K 1/04* (2013.01); *B60L 50/64* (2019.02); *B60L 50/66* (2019.02); *H01M 50/543* (2021.01); *B60K 2001/0438* (2013.01); *B60Y 2200/91* (2013.01); *B60Y 2400/112* (2013.01); *H01M 2220/20* (2013.01)

(58) Field of Classification Search
CPC ...... H01M 50/20; H01M 50/64; H01M 50/66; H01M 50/543
See application file for complete search history.

(56) References Cited

U.S. PATENT DOCUMENTS

| | | |
|---|---|---|
| 7,858,224 B2 | 12/2010 | Kim et al. |
| 2007/0015050 A1 | 1/2007 | Jung et al. |

(Continued)

FOREIGN PATENT DOCUMENTS

| | | |
|---|---|---|
| CN | 207896164 U * | 9/2018 |
| DE | 102013203204 A1 * | 8/2014 |

OTHER PUBLICATIONS

Machine Translation of: DE 102013203204 A1, Wartenberg, Aug. 28, 2014.*

(Continued)

*Primary Examiner* — Kenneth J Douyette
(74) *Attorney, Agent, or Firm* — DLA Piper LLP US

(57) ABSTRACT

Disclosed herein is a battery pack including a box body and a plurality of battery modules disposed in the box body and arranged in a horizontal direction. The battery module can include a plurality of battery cells electrically connected to each other by a plurality of first bus bars, the battery cell can include a battery case and two electrode terminals. The disclosed arrangement of the battery modules in the battery pack can effectively avoid short-circuiting the electrode terminals of the battery module caused by the collapse of the box body toward the inside, thereby improving the safety of the battery pack.

16 Claims, 15 Drawing Sheets

(51) Int. Cl.
*B60L 50/64* (2019.01)
*H01M 50/543* (2021.01)

(56) References Cited

U.S. PATENT DOCUMENTS

| 2007/0052390 | A1* | 3/2007 | Kim | B60L 58/21 |
| | | | | 320/116 |
| 2012/0312610 | A1* | 12/2012 | Kim | H01M 10/613 |
| | | | | 180/65.31 |
| 2014/0315073 | A1 | 10/2014 | Kim | |

OTHER PUBLICATIONS

Machine Translation of: CN 20789616 U, Ju et al., Sep. 21, 2018.*
U.S. Appl. No. 16/528,888, Office Action dated Feb. 16, 2021, 15 pages.

* cited by examiner

BATTERY PACK AND VEHICLE

PRIORITY

The present application claims priority to C.N. Application No. CN201811649786.4 filed on Dec. 30, 2018, which is incorporated by reference herein.

FIELD

The present disclosure generally relates to the field of energy storage devices, and in particular, to a battery pack and a vehicle.

BACKGROUND

Secondary battery is a type of electrical battery which can be charged, discharged into a load, and recharged many times, as opposed to a disposable or primary battery, which is supplied fully charged and discarded after use. Secondary battery has the advantages of high energy density, long service life, energy saving and being environmentally friendly, and is widely used in various fields such as new energy vehicles.

A plurality of battery cells are usually stacked together and electrically connected to each other through bus bars to form a battery module, then a plurality of battery modules are assembled in a box body and electrically connected to each other through wires to form a battery pack, and the battery pack is electrically connected to a driving motor of a new energy vehicle. Some traffic accidents such as rollovers and side impacts are almost inevitable during driving, and these traffic accidents may cause deformation of a side surface of the battery pack on the vehicle. The box body of the battery pack is usually made of a conductive metal, and is easily collapsed into the interior of the battery pack when hit by an impact, which may cause a short circuit due to the electrical connection between some charged parts in the battery pack and the box body, which can cause serious consequences, such as fire, explosion of the battery pack, and the like.

Therefore, there is a need for a battery pack that is not susceptible to short-circuiting during impact, thereby addressing the safety issues for its application in vehicles.

SUMMARY

Disclosed herein is a battery pack including a box body forming an accommodating chamber and a plurality of battery modules disposed in the accommodating chamber and arranged in a horizontal direction, in which a first battery module of the battery modules is located at one end of the battery pack in the horizontal direction and a second battery module of the battery modules is located at the other end of the battery pack in the horizontal direction. The battery module can each include a plurality of first bus bars and a plurality of battery cells electrically connected to each other by the plurality of first bus bars. Each battery cell can include a battery case, a first electrode terminal and a second electrode terminal, and the first electrode terminal and the second electrode terminal can both be disposed on the battery case. The first and second electrode terminals in the first battery module can face toward the second battery module, and the first and second electrode terminals in the second battery module can face toward the first battery module.

In some embodiments, a dimension of the battery case in a horizontal direction in the battery pack can be larger than a dimension of the battery case in a vertical direction. In some embodiments, the battery case can include a first surface, and the first and second electrode terminals can be both disposed on the first surface of the battery case. In some embodiments, the battery case can include two second surfaces and two third surfaces, the area of the second surface can be larger than the area of the first surface and larger than the area of the third surface, the two second surfaces can face each other in a vertical direction, the two third surfaces can face each other in a horizontal direction, and any two of the first surfaces, the second surfaces, and the third surfaces can be connected to each other.

In some embodiments, the horizontal direction is a width direction of the battery pack, or the horizontal direction is a length direction of the battery pack.

In some embodiments, the battery case can include a fourth surface facing the first surface; for two adjacent battery modules, the first surface of one battery module and the first surface of the other battery module can face each other. In some embodiments, a partition plate can be disposed between the two adjacent battery modules.

In some embodiments, the number of the plurality of battery modules is an even number, the battery case can include a fourth surface facing the first surface; for any two adjacent battery modules, the first surface of one battery module and the first surface of the other battery module can face each other, or the fourth surface of one battery module and the fourth surface of the other battery module can face each other.

In some embodiments, the number of the plurality of battery modules can be an odd number, the battery case can include a fourth surface facing the first surface; wherein the first surface of one of the battery modules and the fourth face of another one of the battery modules can face each other; the other battery modules except one designated battery module can be defined as a battery module assembly, and for any two adjacent battery modules of the battery module assembly, the first surface of one battery module and the first surface of the other battery module can face each other, or the fourth surface of one battery module and the fourth surface of the other battery module can face each other.

In some embodiments, the plurality of battery modules can be electrically connected to each other by a plurality of second bus bars, and wherein the plurality of second bus bars can be located at the same end of the battery modules.

In some embodiments, the battery module can also include a tying band, which can surround an outer periphery of the plurality of battery cells, the tying band can include a long side and a short side, the long side can face a top surface of the battery module or a bottom surface of the battery module and can extend in the horizontal direction, and the short side can face a side surface of the battery module and can extend in the vertical direction.

In some embodiments, the battery module can include two end plates, which can be respectively disposed at two ends of the plurality of battery cells; and the tying band can surround the outer periphery of the plurality of battery cells and the two end plates.

In some embodiments, the battery pack can include two or three battery cells stacked in a vertical direction in the battery module.

In some embodiments, also disclosed herein is a vehicle including a vehicle body and the battery pack discussed above, wherein the battery pack can be disposed at a bottom of the vehicle body, the first battery module and the second battery module can be respectively arranged on two sides in a width direction of the vehicle body, or, the first battery module and the second battery module can be respectively arranged on two sides in a length direction of the vehicle body.

BRIEF DESCRIPTION OF DRAWINGS

In order to facilitate a full understanding of the present disclosure, reference is now made to the accompanying drawings, in which like elements are referenced with like numerals. These drawings should not be construed as limiting the present disclosure, but are intended to be illustrative only. The drawings are not necessarily to scale, or inclusive of all elements of a system, emphasis instead generally being placed upon illustrating the concepts, structures, and techniques sought to be protected herein.

DESCRIPTION

Figure 1:
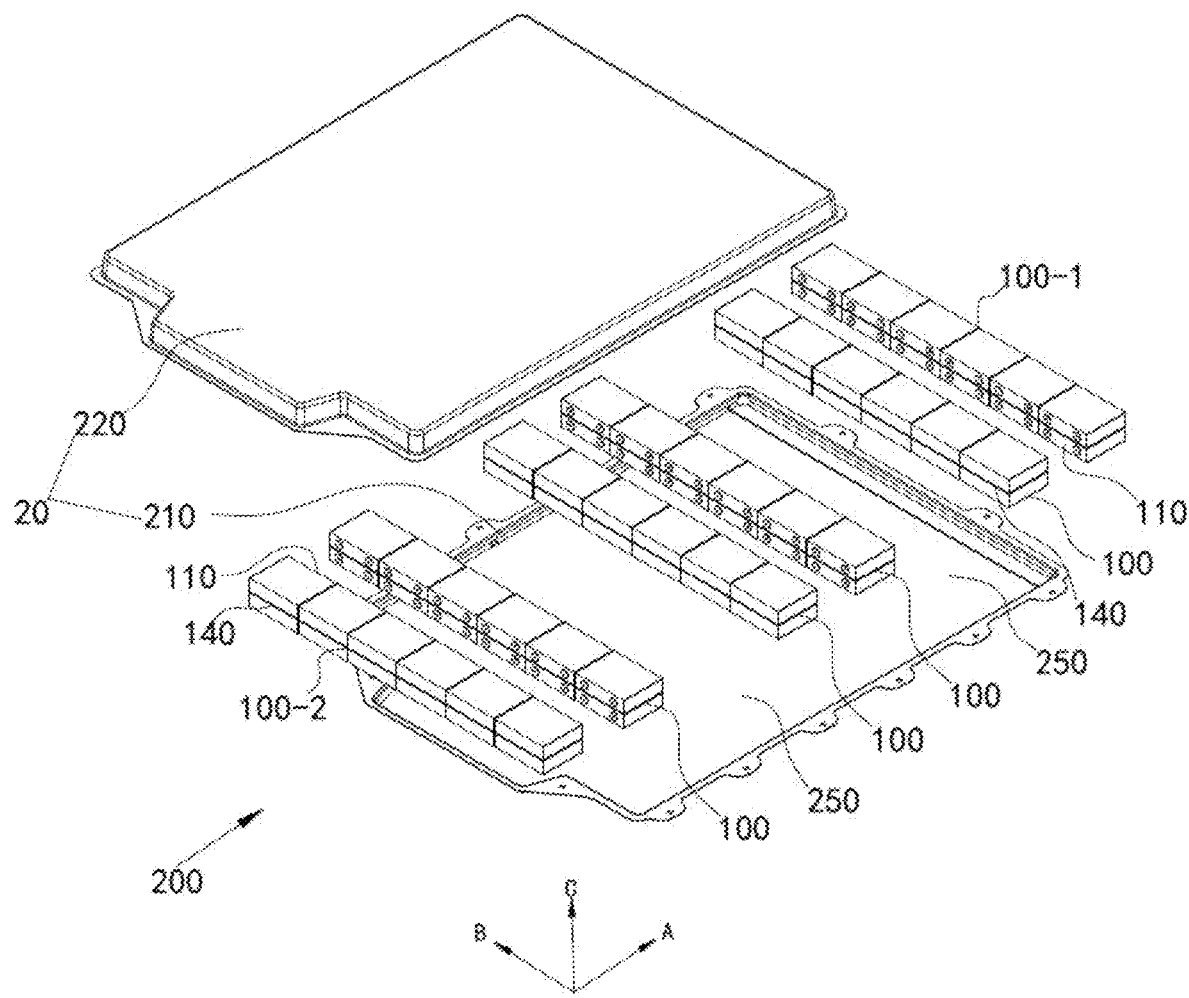
FIG. 1 is an exploded view of a battery pack, according to some embodiments of the present disclosure.

The battery pack and vehicle according to the present disclosure will be further described in detail with reference to the accompanying drawings. Description of the reference signs:

100, battery module;
100-1, first battery module;
100-2, second battery module;
100-3, third battery module;
100-4, fourth battery module;
1, battery cell;
11, electrode assembly;
12, battery case;
13, cover assembly;
131, first electrode terminal;
132, second electrode terminal;
14, adapter piece;
111, first electrode sheet;
112, second electrode sheet;
113, separator;
114, flat face;
115, narrow face;
110, first surface;
120, second surface;
130, third surface;
140, fourth surface;
200, battery pack;
20, box body;
210, lower box body;
220, upper box cover;
2, end plate;
21, main body of the end plate;
22, tying band limiting slot;
3, tying band;
31, long side;
32, short side;
4, insulation part;
5, first bus bar;
6, second bus bar; and
7, partition plate.

To describe in detail the technical contents, structural features, objects and effects of the technical solutions of the present disclosure, a detailed description in conjunction with the specific embodiments and accompanying drawings is provided below.

In the description of the present disclosure, the terms "first" and "second" are used for descriptive purposes only, and should not be construed as indicating or implying the relative importance thereof, unless otherwise specified or explained. The term "a plurality of" means two or more; the terms "connected", "fixed" and the like should be understood broadly. For example, "connected" may be a fixed connection, or a detachable connection, or an integral connection, or an electrical connection; it may be directly connected or indirectly connected though an intermediate medium. For a person of ordinary skill in the art, the specific meanings of the above terms in the present disclosure can be understood in their specific contexts.

In the description of the present disclosure, the direction indicated by arrow A in all the drawings is the length direction, the direction indicated by arrow B is the width direction, and the direction indicated by arrow C is the vertical direction. The horizontal direction is a direction parallel to the horizontal plane, and may be the above-described length direction or the above-described width direction. In addition, the horizontal direction includes not only the direction that is absolutely parallel to the horizontal plane, but also the direction generally parallel to the horizontal plane as conventionally recognized in engineering. The vertical direction is the direction perpendicular to the horizontal plane, and the vertical direction includes not only the direction absolutely perpendicular to the horizontal plane, but also the direction generally perpendicular to the horizontal plane as conventionally recognized in engineering. In addition, the terms "upper", "lower", "top", "bottom" and the like are understood relative to the vertical direction.

The type of battery can include, but is not limited to, lithium ion battery, aluminum ion battery, carbon battery, flow battery, lead-acid battery, glass battery, magnesium ion battery, metal air battery, molten salt battery, nickel cadmium battery, nickel hydrogen battery, nickel iron battery, nickel metal hydride battery, nickel zinc battery, organic radical battery, polymer-based battery, fuel cell, lithium sulfur battery, sodium ion battery, sodium sulfur battery, and zinc ion battery. In some embodiments, the battery is a lithium ion battery.

Different from the conventional technology, the battery pack in the present disclosure can include a plurality of battery modules, and among the plurality of battery modules, a battery module located at one end of the outermost side of the battery pack in the horizontal direction is defined as a first battery module, and a battery module located at the other end of the outermost side of the battery pack in the horizontal direction is defined as a second battery module, in which each of the first electrode terminals and each of the second electrode terminals in the first battery module face the second battery module, and each of the first battery terminals and each in the second electrode terminals face the first battery module. All of the electrode terminals in the first battery module and the second battery module can face toward a middle portion of the battery pack. Therefore, when a side surface of the battery pack is impacted, there can be a reduced probability that the inner wall of the box body contacts the first electrode terminal and the second electrode terminal in the battery module, thereby effectively reducing the risk of short circuit of the battery pack, and improving the safety of the battery pack.

In some embodiments, a vehicle is provided, the vehicle can include a vehicle body and a battery pack, the battery pack can be disposed in the vehicle body. A battery pack 200 is illustrated in any one of FIGS. 1 to 5, in which battery pack 200 can be disposed at the bottom of the vehicle body. A first battery module 100-1 and a second battery module 100-2 of a plurality of battery modules 100 can be respectively located on two sides in the width direction of the vehicle body. Alternatively, first battery module 100-1 and second battery module 100-2 of the plurality of battery modules 100 can be located on two sides in the length direction of the vehicle body. It should be noted that the length direction of the vehicle body and the width direction of the vehicle body can be for a vehicle during normal operational positions. The length direction of the vehicle body can refer to the direction from the front end of a vehicle toward the rear end of the vehicle. The width direction of the vehicle body can refer to the direction from one side of a vehicle toward the other side of the vehicle. The length direction of the vehicle body and the width direction of the vehicle body can be both substantially parallel to the horizontal plane.

The vehicle can be a new energy vehicle, which can be an electric vehicle, a hybrid vehicle or a range extended electric vehicle (REEV). A driving motor can be arranged in the main body of the vehicle, and the driving motor can be electrically connected with battery pack 200. Battery pack 200 can provide electric energy to the driving motor, and the driving motor can be connected to the wheels of the vehicle body via a transmission mechanism, so as to drive the vehicle to move. In some embodiments, battery pack 200 can be horizontally disposed at the bottom portion of the vehicle main body.

FIG. 1 shows battery module 200, according to some embodiments of the present disclosure. Battery pack 200 can be disposed at the bottom of the vehicle main body, first battery module 100-1 can be close to one end in the length direction of the vehicle body, and second battery module 100-2 can be close to the other end in the length direction of the vehicle body. The length direction of the vehicle body can be the direction indicated as direction A as shown in FIG. 1. The width direction of the vehicle body can be the direction indicated as the direction B as shown in FIG. 1.

Figure 2:
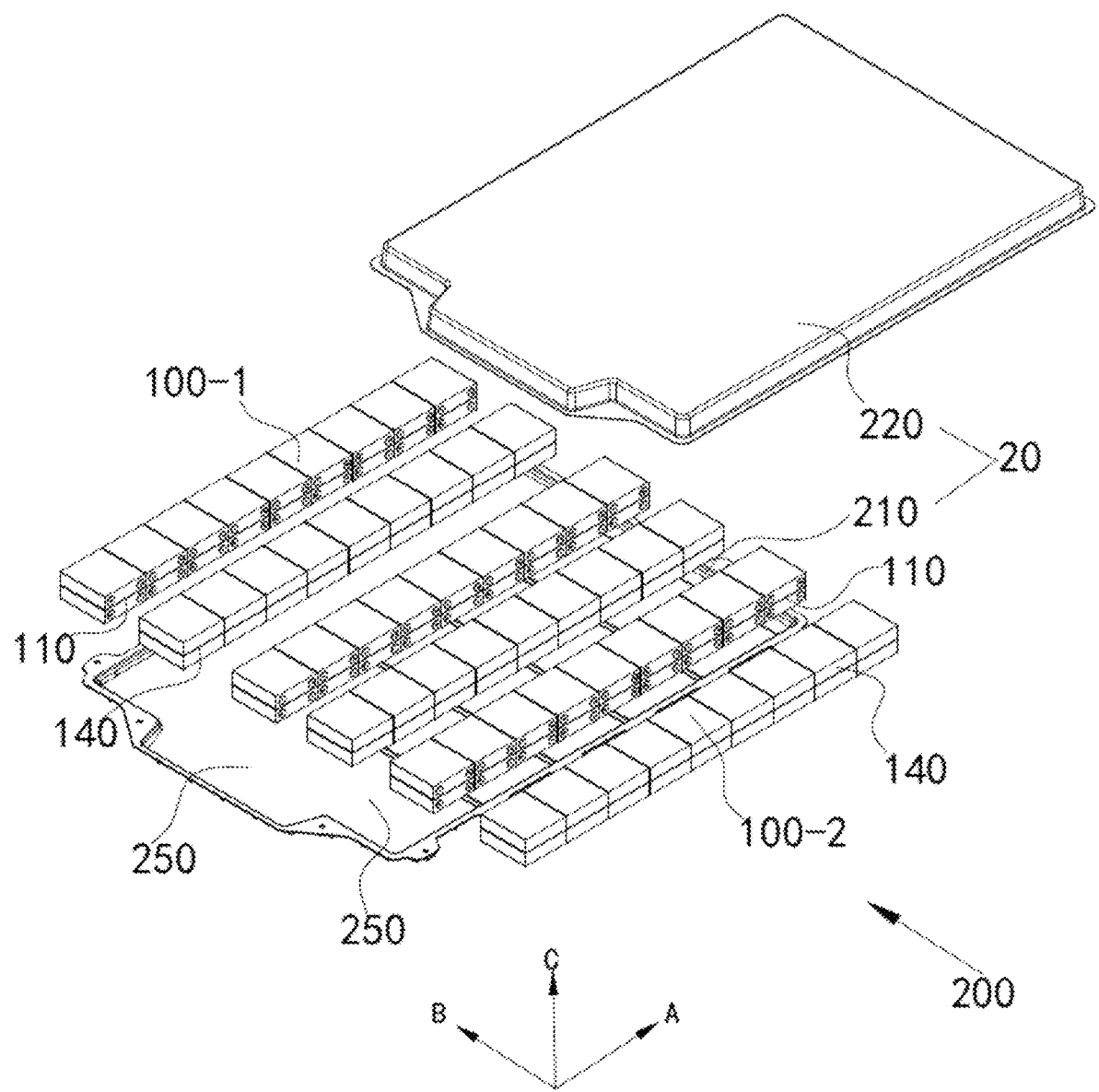
FIG. 2 is an exploded view of a battery pack, according to some embodiments of the present disclosure.
Figure 3:
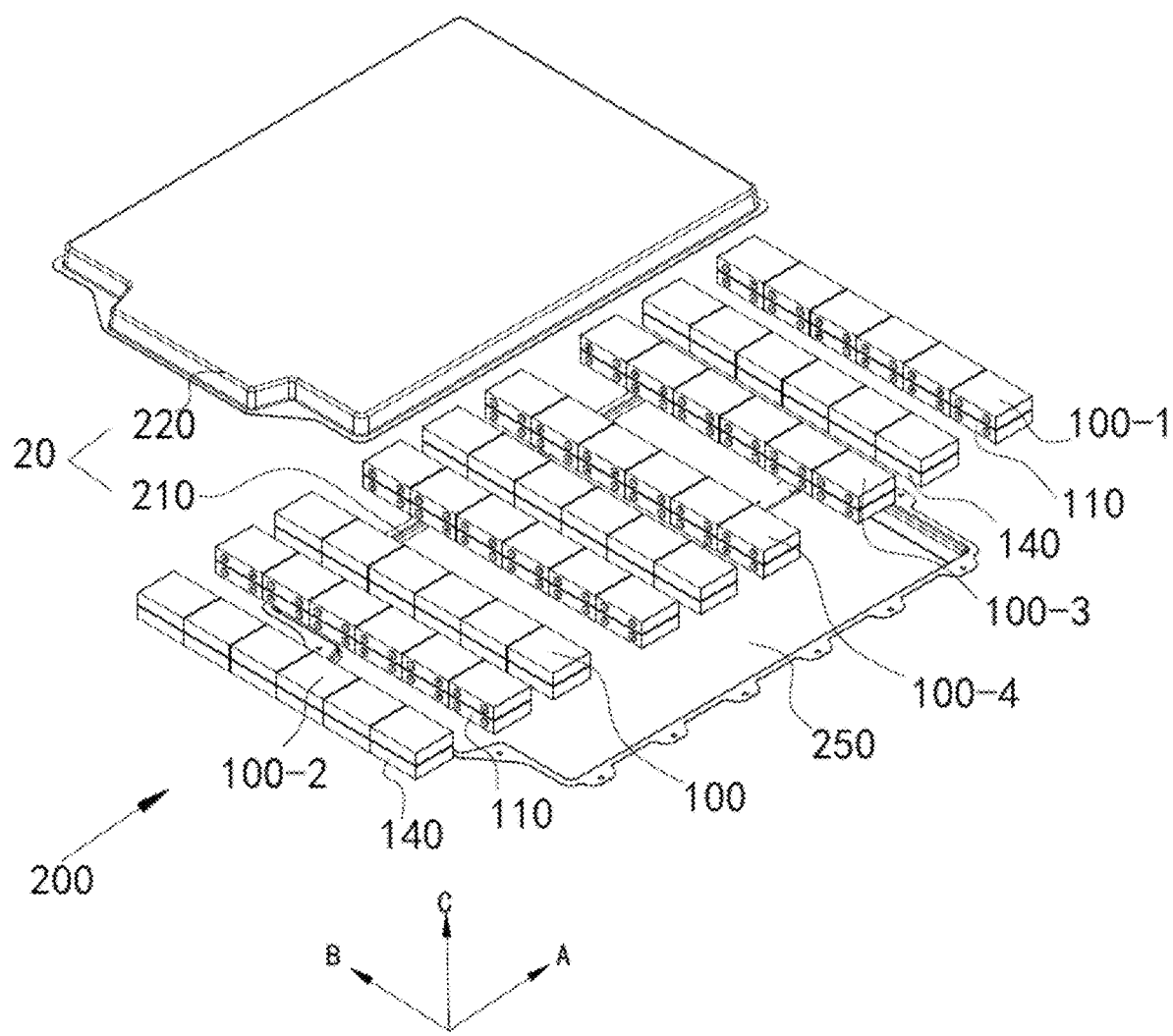
FIG. 3 is an exploded view of a battery pack, according to some embodiments of the present disclosure.

As shown in FIGS. 1 to 3, which are the exploded views of the battery pack 200 according to some embodiments of the present disclosure, battery pack 200 can include a box body 20 and a plurality of battery modules 100, wherein box body 20 can include an upper box cover 220 and a lower box body 210. Lower box body 210 and upper box cover 220 can cooperate to form a sealed box body having an accommodating chamber 250, and the plurality of battery modules 100 can be arranged in accommodating chamber 250. Box body 20 may be made of metal or non-metal materials. Exemplary metal materials to make box body 20 can include, but not limited to, aluminum and aluminum alloy.

As shown in FIGS. 1 to 3, the plurality of battery modules 100 can be disposed in accommodating chamber 250 of box body 20, and the plurality of battery modules 100 can be arranged in the horizontal direction. That is, it can be the length direction as indicated by arrow A, or it can be the width direction as indicated by the arrow B. For example, in FIG. 1, the plurality of battery modules 100 can be arranged in the direction indicated by arrow A, wherein the direction indicated by arrow A is the length direction of the vehicle body. In FIG. 2, the plurality of battery modules 100 can be arranged in the direction indicated by arrow B, wherein the direction indicated by arrow B is the width direction of the vehicle body. Among the plurality of battery modules 100, battery module 100 located at one end of the outermost side of the battery pack in the horizontal direction can be defined as first battery module 100-1, battery module 100 located at the other end can be defined as second battery module 100-2. For example, in FIG. 1, first battery module 100-1 can be located at one end of the outermost side of the battery pack in the direction indicated by arrow A, and second battery module 100-2 can be located at the other end of the outermost side of the battery pack in the direction indicated by arrow A. In FIG. 2, first battery module 100-1 can be located at one end of the outermost side of the battery pack in the direction indicated by arrow B, and second battery module 100-2 can be located at the other end of the outermost side of the battery pack in the direction indicated by arrow B.

Each of the first electrode terminals 131 and each of the second electrode terminals 130 in first battery module 100-1 can be oriented toward the second battery module 100-2; in addition, each of the first electrode terminals 131 and each of the second electrode terminals 130 in second battery module 100-2 can be oriented toward the first battery module 100-1. That is, all of the first electrode terminal 131 and the second electrode terminal 132 in the first battery module 100-1 and in the second battery module 100-2 can be oriented toward the middle portion of the battery pack.

Figure 4:
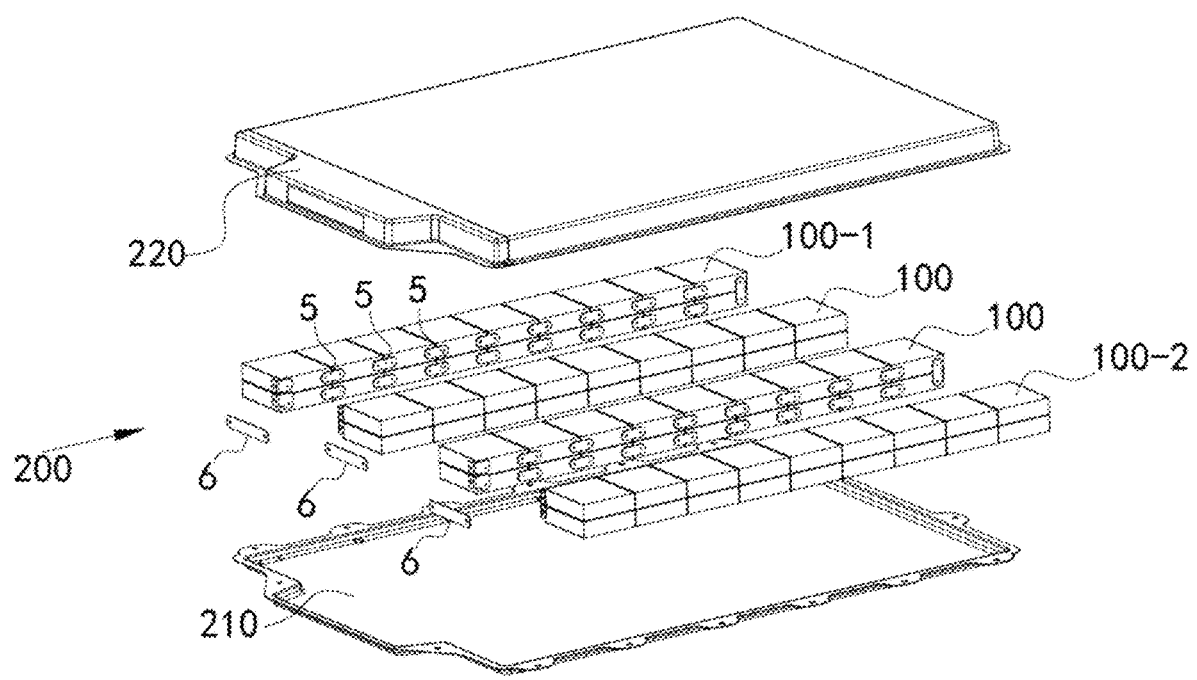
FIG. 4 is an exploded view of a battery pack, according to some embodiments of the present disclosure.
Figure 5:
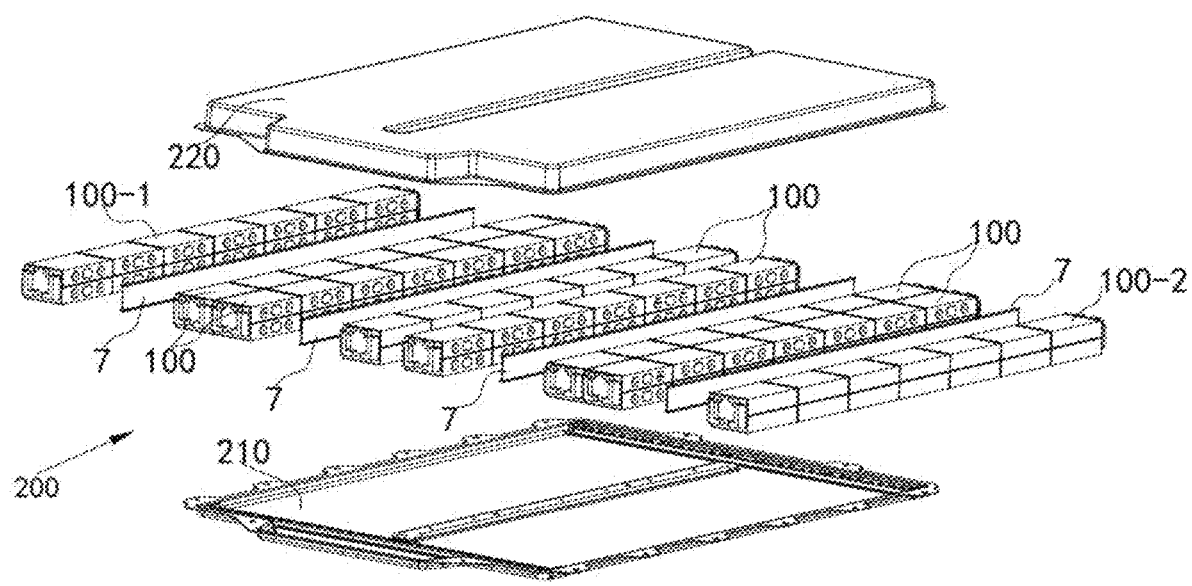
FIG. 5 is an exploded view of a battery pack, according to some embodiments of the present disclosure.

Similarly, in some embodiments of the present disclosure shown in FIGS. 3 and 4, first electrode terminal 131 and second electrode terminal 132 in first battery module 100-1 can be both oriented toward second battery module 100-2, and first electrode terminal 131 and second electrode terminal 132 in second battery module 100-2 can be both oriented toward the first battery module 100-1.

In some embodiments, all of the electrode terminals in first battery module 100-1 and second battery module 100-2 located on the outermost sides of two ends of the battery pack 200 in the horizontal direction can be both oriented toward the middle portion of battery pack 200. Such that even if when a side surface of battery pack 200 is impacted, there is still a reduced probability for the inner wall of box body 20 to contact first electrode terminal 131 and second electrode terminal 132 in battery module 100, thereby effectively reducing the risk of short circuit of the battery pack, as well as improving the safety of the battery pack.

Figure 6:
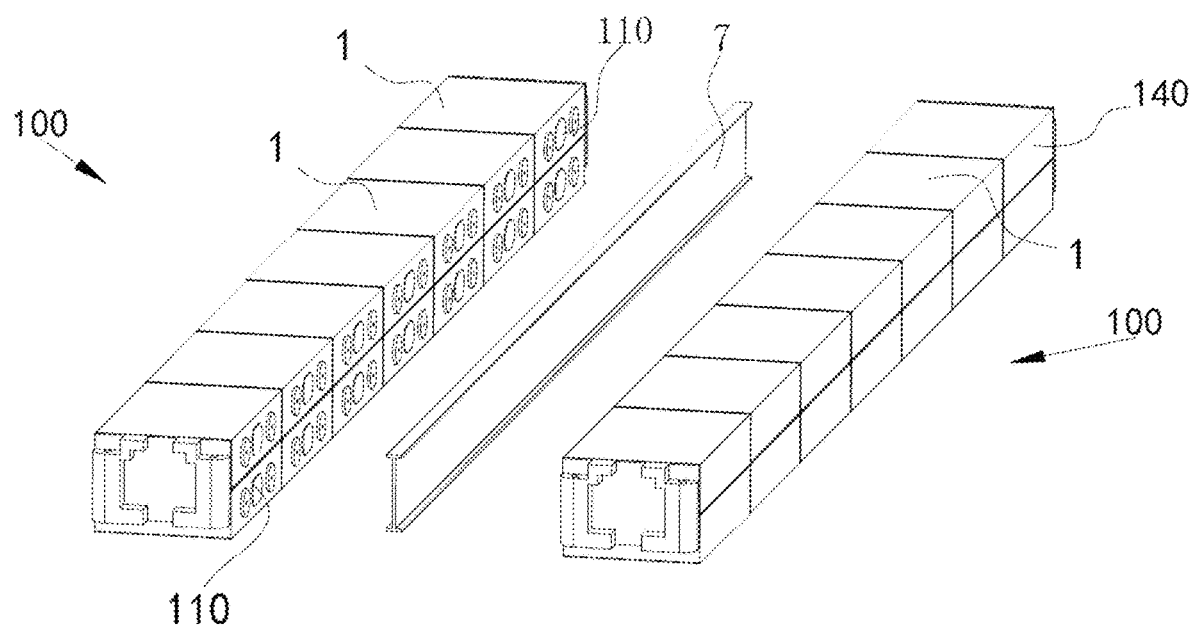
FIG. 6 is a schematic view showing a partition plate and a battery module, according to some embodiments of the present disclosure.

FIG. 6 shows a side surface in the plurality of battery modules 100 inside battery pack 200, on which first electrode terminal 131 and second electrode terminal 132 are located, a partition plate 7 can be further provided, according to some embodiments of the present disclosure. Partition plate 7 can be made of an insulating and high temperature resistant material, including, but not limited to an asbestos plate and a mica plate. When battery pack 200 is hit, partition plate 7 can prevent first electrode terminal 131 and second electrode terminal 132 of two adjacent battery modules 100 from being short-circuited, thereby further improving the safety of the battery pack.

Figure 7:
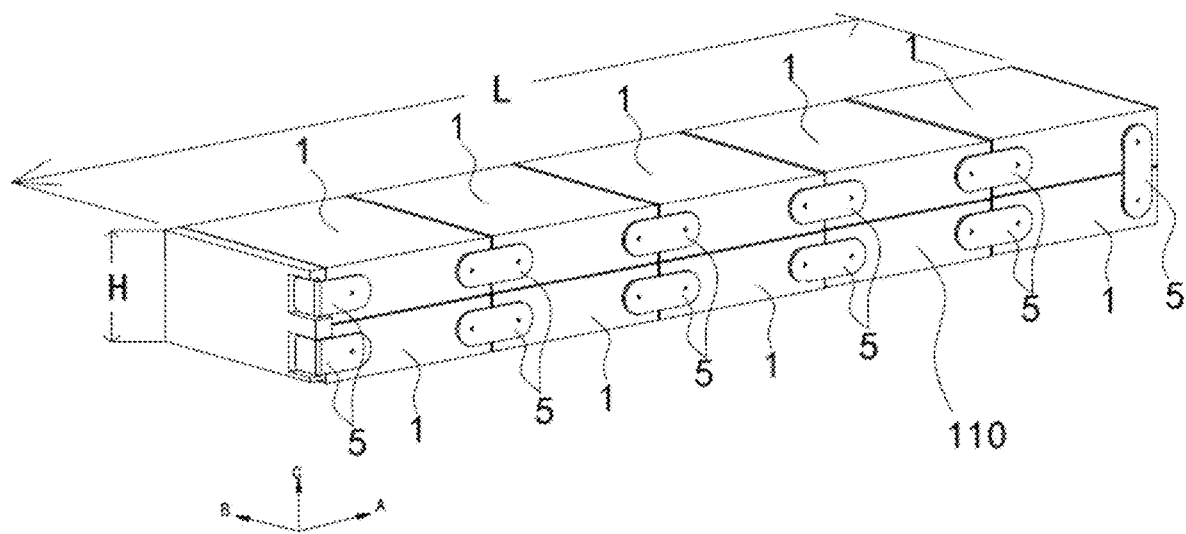
FIG. 7 is a schematic structural view of a battery module, according to some embodiments of the present disclosure.

FIG. 7 shows a schematic structural view of battery module 100, according to some embodiments of the present disclosure. Battery module 100 can include a plurality of battery cells 1 arranged in a horizontal direction (for example, the direction indicated by arrow A) and a plurality of first bus bars 5 electrically connected to the plurality of battery cells 1. Battery cell 1 can be a secondary battery that can be repeatedly charged and discharged, and the plurality of battery cells 1 are connected in series, in parallel, or a mixed connection through a plurality of first bus bars 5. In some embodiments, battery module 100 can further include a plurality of battery cells 1 arranged in a vertical direction. The dimension L of battery module 100 in the horizontal direction can be larger than the dimension H of battery module 100 in the vertical direction, that is, for battery module 100 shown in FIG. 7, the dimension L of in the direction indicated by arrow A can be larger than the dimension H in the direction indicated by arrow C.

Figure 8:
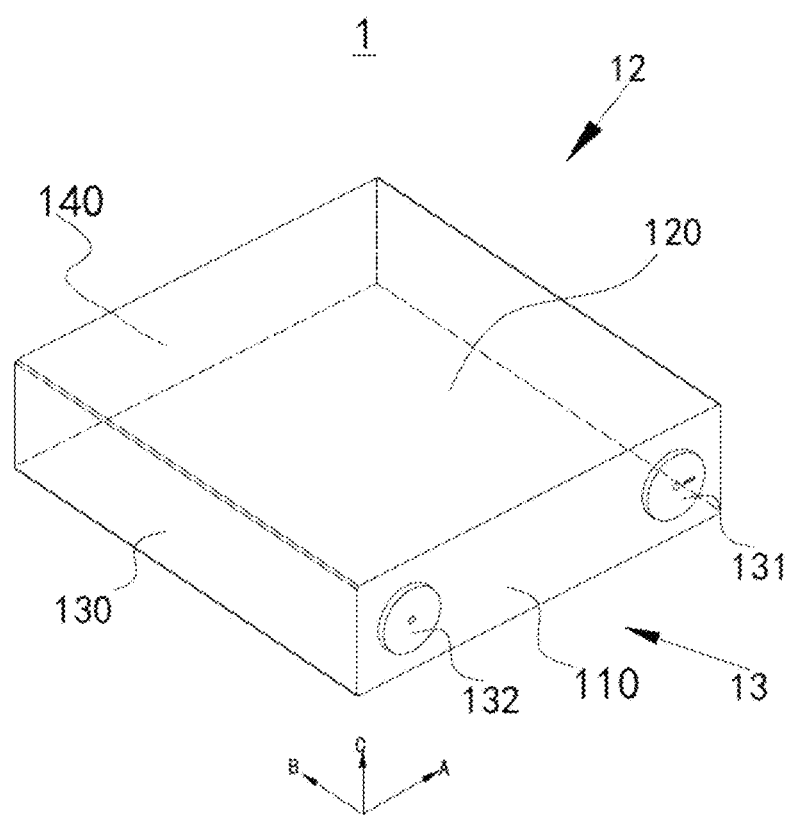
FIG. 8 is a schematic structural view of a battery cell, according to some embodiments of the present disclosure.

FIG. 8 shows the structure of battery cell 1, according to some embodiments of the present disclosure. Battery cell 1 can include a battery case 12, first electrode terminal 131 and second electrode terminal 132. First electrode terminal 131 and second electrode terminal 132 can be both disposed on a first surface 110 of battery case 12. Battery case 12 can be made of a metal material or non-metal material. Exemplary metal material can include, but not limited to, aluminum, aluminum alloy, and nickel-plated steel. In some embodiments, battery case 12 can have a rectangular box shape. First electrode terminal 131 can be a positive electrode terminal, and second electrode terminal 132 can be a negative electrode terminal. In some embodiments, first electrode terminal 131 can be a negative electrode terminal, and second electrode terminal 132 can be a positive electrode terminal.

As shown in FIGS. 1, 2 and 4, battery pack 200 can have an even number of battery modules 100, including first battery module 100-1 and second battery module 100-2. Battery case 12 can include first surface 110 provided with first electrode terminal 131 and second electrode terminal 132, and a fourth surface 140 facing first surface 110. The positional relationship of first surface 110 and fourth surface 140 of the battery case 12 can be seen in reference to the battery cell structure as shown in FIG. 8. As shown in FIG. 1, for any two adjacent battery modules 100, the first surface 110 of one battery module 100 can face the first surface 100 of the other battery module 100, or the fourth surface 140 of one battery module 100 can face the fourth surface 140 of another battery module 100.

In the battery pack shown in FIGS. 1, 2 and 4, first surface 110 of one battery module 100 can face first surface 110 of an adjacent battery module 100, on the one hand it is convenient for the two adjacent battery modules 100 to be electrically connected by a bus bar, and on the other hand, it can facilitate insulation protection for the charged parts including first electrode terminal 131, second electrode terminal 132 and first bus bar 5. Insulation can be achieved by providing only one partition plate 7 between two adjacent battery modules 100, thereby reducing the number of partition plates 7 used and increasing the energy density of the battery pack.

As shown in FIG. 3, battery pack 200 can have an odd number of battery modules 100, including a first battery module 100-1 and a second battery module 100-2. Similarly, battery case 12 can include first surface 110 and fourth surface 140 that can face first surface 110.

To facilitate the description of how an odd number of battery modules 100 can be arranged, in FIG. 3, one of the battery modules located in the middle of the battery pack can be designated as a third battery module 100-3, and another battery module located in the middle of the battery pack can be designated as a fourth battery module 100-4. As can be seen from FIG. 3, in addition to third battery module 100-3, other battery modules 100 can all achieve as follows: for any two adjacent battery modules 100, first surface 110 of one battery module 100 and first surface 110 of the other battery module 100 can face each other, or fourth surface 140 of one battery module 100 and fourth surface 140 of another battery module 100 can face each other.

In the battery pack shown in FIG. 3, first surface 110 of one battery module 100 can be made to face first surface 110 of an adjacent battery module 100 as much as possible. Therefore, on the one hand, it facilitates the electrical connection between these two adjacent battery modules 100; on the other hand, it also facilitates the insulation and protection of the charged parts such as first electrode terminal 131, second electrode terminal 132 and first bus bar 5; moreover, the insulation can be achieved for two adjacent battery modules 100 by providing only one partition plate 7 therebetween, thereby reducing the number of partition plates 7 and improving the energy density of the battery package.

In battery cell 1, since an explosion-proof valve can be generally disposed on the same end surface (that is, the first surface 110) with first electrode terminal 131 and second electrode terminal 132, partition plate 7 can be also arranged between two explosion-proof valves of two adjacent battery modules 100. By providing partition plate 7, the high-temperature flame generated when the explosion-proof valve of battery cell 1 bursts can be prevented from directly acting onto battery cell 1 on the opposite side, thereby avoiding the thermal runaway of the entire battery pack and improving the safety of battery pack 200.

Partition plate 7 can be made of a mica plate, according to some embodiments of the present disclosure. Since the mica plate has good insulation performance and a high melting point (1723° C.), the fire-resistance requirement can be achieved. In addition, the mica plate has excellent processing properties. Other insulating high temperature resistant materials are also contemplated for partition plate 7, according to some embodiments of the present disclosure. Adjacent two battery modules 100 can share one partition plate 7, which can reduce the number of partition plates 7 used, thereby further increasing the energy density of battery package 200.

Battery cell 1 can be substantially a hexahedral structure, according to some embodiments of the present disclosure, which can include one first surface 110, one fourth surface 140, two second surfaces 120, and two third surfaces 130. First surface 110 and fourth surface 140 can be substantially parallel to each other, both can be substantially parallel to the vertical direction. First electrode terminal 131 and second electrode terminal 132 can be disposed on the first surface 110. Fourth surface 140 can face first surface 110, and the two second surfaces 120 can face each other. The two third surfaces 130 can face each other and can be substantially parallel to the vertical direction. Any two of the third surface 130, the first surface 110 and the second surface 120 can be connected to each other, which are further perpendicular to each other. The area of second surface 120 can be larger than the area of first surface 110 and can also be larger than the area of third surface 130.

Figure 9:
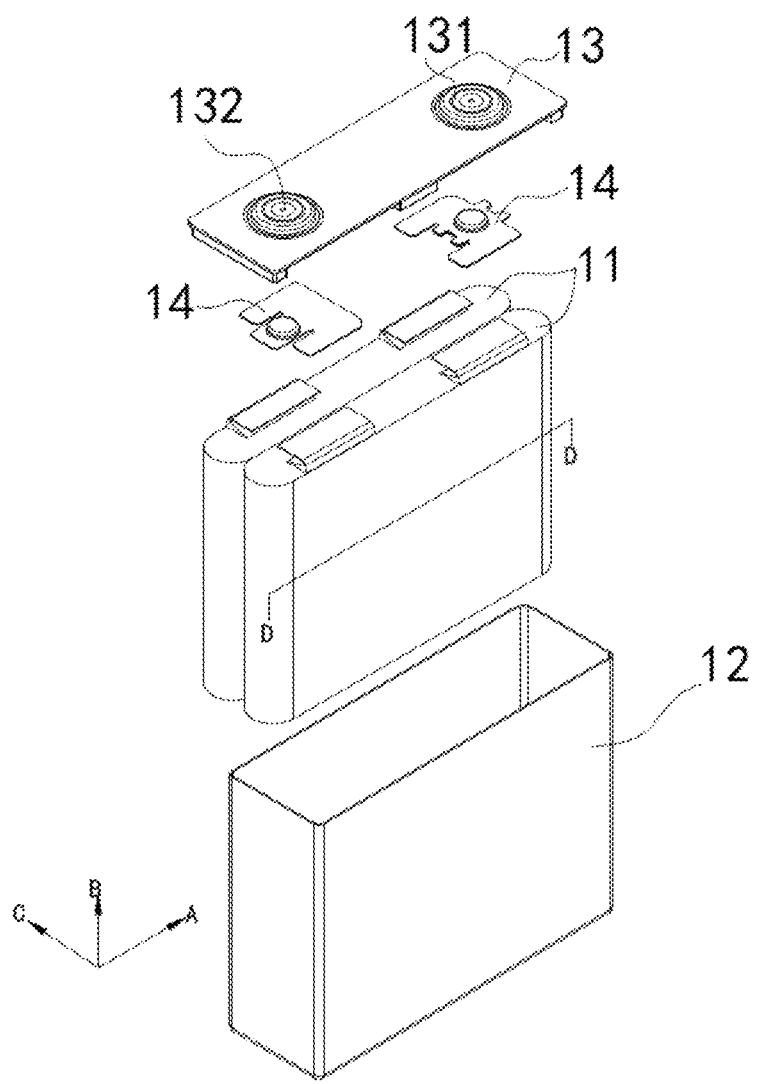
FIG. 9 is an exploded view of a battery cell, according to some embodiments of the present disclosure.

FIG. 9 shows battery cell 1, according to some embodiments of the present disclosure, which can include battery case 12 and an electrode assembly 11. In some embodiments, battery case 12 can have a hexahedral shape or other shape, and can have an opening. Electrode assembly 11 can be accommodated in battery case 12. The opening of battery case 12 can be covered with a cover assembly 13. Cover assembly 13 can include a cover plate and electrode terminals disposed on the cover plate, the electrode terminals can include first electrode terminal 131 and second electrode terminal 132, in which first electrode terminal 131 can be a positive electrode terminal, and second electrode terminal 132 can be a negative electrode terminal. In some embodiments, first electrode terminal 131 can be a negative electrode terminal, and second electrode terminal 132 can be a positive electrode terminal. The cover plate can be made of metal material or non-metal materials. Exemplary metal materials can include, but not limited to aluminum and aluminum alloy, and the size of the cover plate can be adapted to the size of the opening of battery case 12. The electrode terminals can be fixed to the cover plate by means of welding or by a fixing member such as a rivet. The electrode lugs of electrode assembly 11 can be electrically connected to the electrode terminals on the cover plate through adapter piece 14. In some embodiments, there can be two adapter pieces 14, which can be respectively a positive electrode adapter and a negative electrode adapter.

FIG. 9 shows two electrode assemblies 11 can be provided in battery case 12, and the two electrode assemblies 11 can be stacked in the vertical direction (the direction indicated by arrow C). In some embodiments, the number of electrode assemblies disposed in battery case 12 can be about one, two, three, four, or five. In some embodiments, the number of electrode assemblies disposed in battery case 12 can be equal to or more than about six. The plurality of electrode assemblies can be stacked in the vertical direction (the direction indicated by arrow C).

Figure 10:
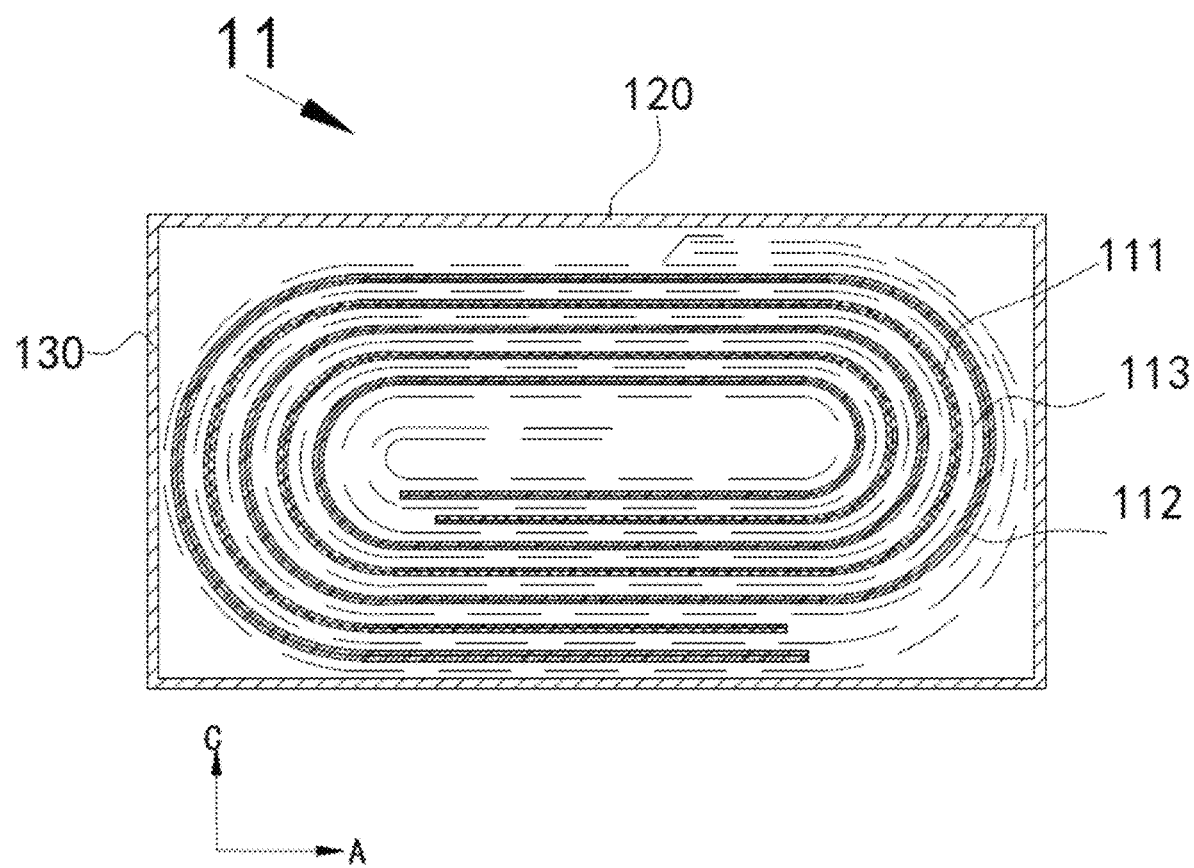
FIG. 10 is a cross-sectional view of an electrode assembly of a wound structure, according to some embodiments along D-D direction as shown in FIG. 9.
Figure 11:
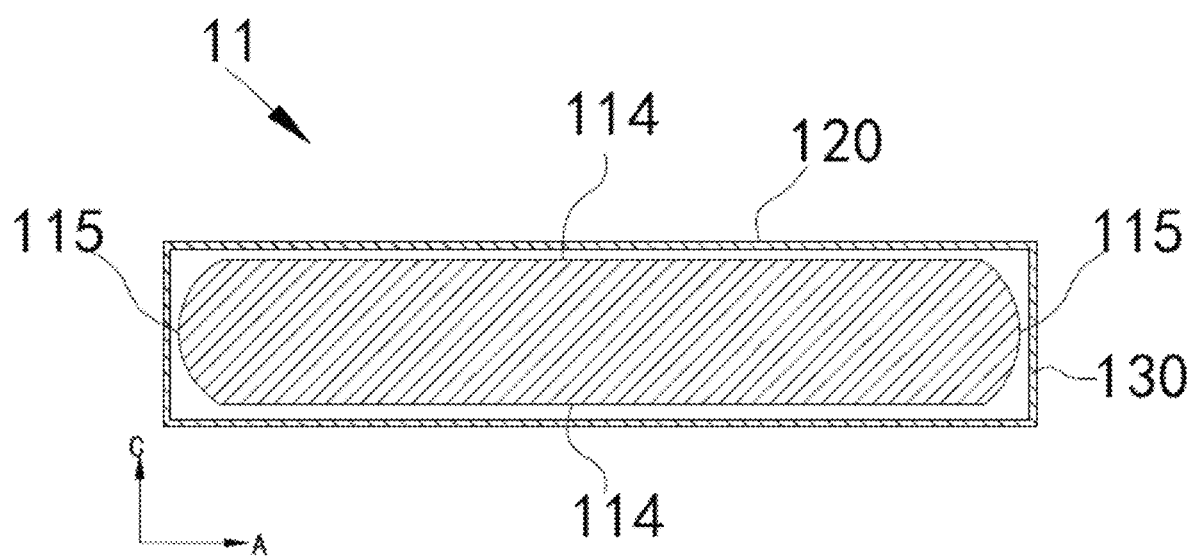
FIG. 11 is a schematic view of the outline a cross section of an electrode assembly of a wound structure, according to some embodiments along D-D direction as shown in FIG. 9.
Figure 12:
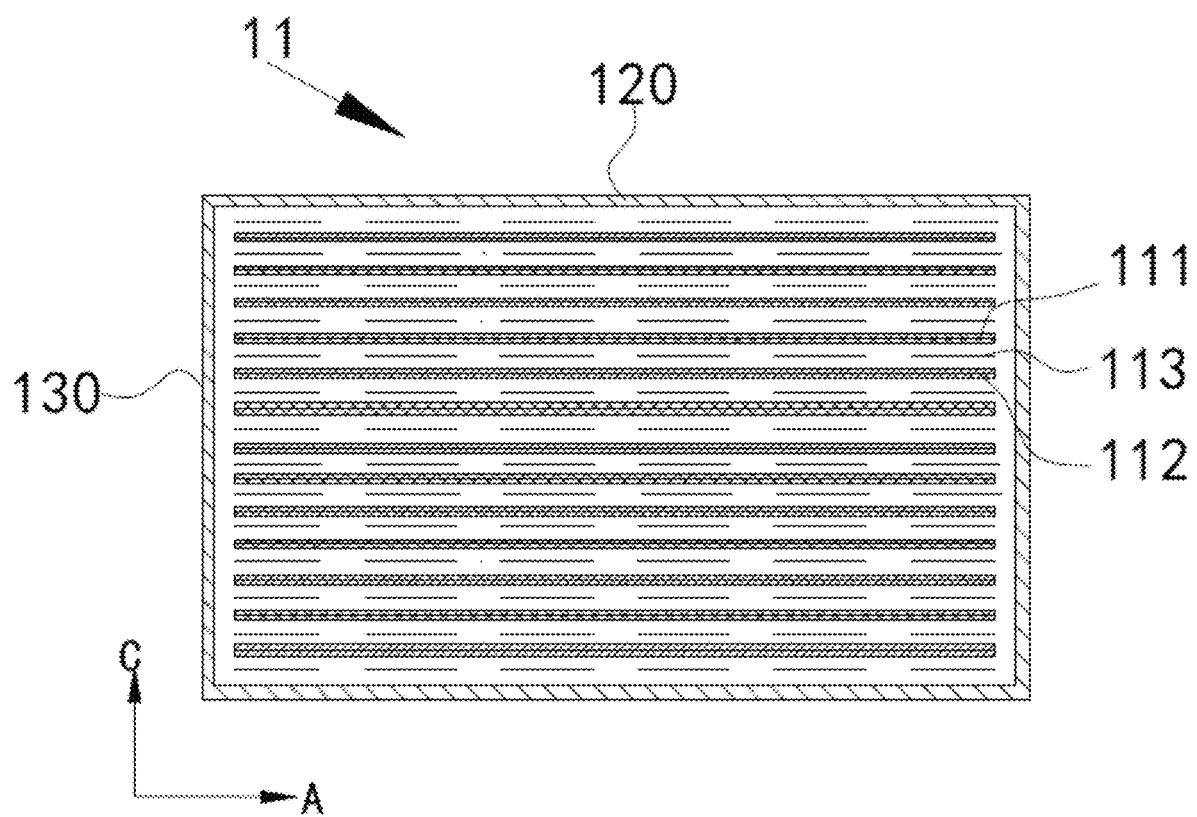
FIG. 12 is a cross-sectional view of an electrode assembly of a laminated structure, according to a some embodiments along D-D direction as shown in FIG. 9.

As shown in FIGS. 10, 11, and 12, electrode assembly 11 can include a first electrode sheet 111, a second electrode sheet 112, and a separator 113 disposed between first electrode sheet 111 and second electrode sheet 112. First electrode sheet 111 can be a positive electrode piece and second electrode sheet 112 can be a negative electrode piece. In some embodiments, first electrode sheet 111 can be a negative electrode piece, and second electrode sheet can be a positive electrode piece. Separator 113 can be an insulator provided between first electrode sheet 111 and second electrode sheet 112. The active material of the positive electrode sheet can be coated on the coating area of the positive electrode sheet, and the active material of the negative electrode sheet may be applied onto the coating area of the negative electrode sheet. A portion extending from the coating area of the positive electrode sheet can serve as a positive electrode lug; a portion extending from the coating area of the negative electrode sheet can serve as a negative electrode lug. The positive electrode lug can be connected to the positive electrode terminal on cover assembly 13 through the positive electrode adapter piece, and similarly, the negative electrode lug can be connected to the negative electrode terminal on cover assembly 13 through the negative electrode adapter piece.

FIG. 10 shows electrode assembly 11 with a wound structure, according to some embodiments of the present disclosure. First electrode sheet 111, separator 113, and second electrode sheet 112 can be strip-shaped structures. First electrode sheet 111, separator 113, and second electrode sheet 112 can be sequentially laminated and wound two or more times to form electrode assembly 11. In addition, electrode assembly 11 can be in a flat shape. When electrode assembly 11 is fabricated, electrode assembly 11 can be first wound into a hollow cylindrical structure, and then flattened by pressure after being wound.

FIG. 11 is a schematic view showing the outline of electrode assembly 11. The outer surface of electrode assembly 11 can include two flat faces 114, and the two flat faces 114 can face each other in the vertical direction (the direction indicated by arrow C), that is, flat faces 114 and first surface 110 of battery case 12 can be oppositely arranged. Electrode assembly 11 can be substantially a hexahedral structure, and flat face 114 can be substantially parallel to the winding axis and is the outer surface having the largest area. Flat face 114 can be a relatively flat surface and is not required to be an absolutely flat surface. The two flat faces 114 can be referred to in terms of narrow faces 115 on two sides of electrode assembly 11; in addition, the area of flat face 114 can be larger than narrow face 115 of electrode assembly 11.

FIG. 12 shows electrode assembly 11 with a laminated structure, according to some embodiments of the present disclosure. Electrode assembly 11 can have a plurality of first electrode sheet 111 and a plurality of second electrode sheet 112, and separator 113 can be disposed between first electrode sheet 111 and second electrode sheet 112. First electrode sheet 111, separator 113, and second electrode sheet 112 can be stacked sequentially. Among them, first electrode sheet 111, separator 113, and second electrode sheet 112 can be stacked in the vertical direction (the direction indicated by arrow C).

Since electrode assembly 11 will inevitably expand in the thickness direction of the electrode sheet during the processes of charging and discharging, in electrode assembly 11 with a wound structure, the expansion force is the largest in the direction perpendicular to flat face 114, while in electrode assembly 11 with a laminated structure, the expansion force is the largest in the stacking direction of first electrode sheet 111 and second electrode sheet 112.

In the conventional technology, in battery cells 1 of battery module 100, the direction in which electrode assembly 11 applies the largest expansion force to battery case 12 is toward the horizontal direction. The dimension of battery module 100 in the horizontal direction is much larger than the dimension thereof in the vertical direction, for example, limited by the chassis height dimension of a vehicle, more battery cells 1 need to be stacked in the horizontal direction, and the expansion force is thus accumulated in this direction. Therefore, the expansion force of current battery module 100 in the horizontal direction can be very large, so it is necessary to provide thick end plates on both sides of battery module 100 in the horizontal direction to resist the expansion force. However, an increase in the thickness of the end plate with bigger weight will reduce the energy density of battery module 100. In some embodiments of the present disclosure, electrode assembly 11 can be of a wound structure or a laminated structure. In the case where electrode assembly 11 is of a wound structure, flat face 114 can face towards the vertical direction. In the case where the electrode assembly is of a laminated structure, first electrode sheet 111 and second electrode sheet 112 can be stacked in the vertical direction. It can be seen that regardless whether electrode assembly 11 adopts a wound structure or a laminated structure, the direction in which electrode assembly 11 applies the largest expansion force to battery case 12 is toward the vertical direction.

The direction in which electrode assembly 11 applies the largest expansion force to battery case 12 is toward the vertical direction, and the number of battery cells stacked in the vertical direction is relatively small. As a result, the present disclosure can reduce the largest expansion force of battery module 100 compared to the conventional technology, and thus a smaller-sized end plate can be selected, thereby increasing the energy density of battery module 100. As shown in FIG. 7, in battery module 100, the number of layers of the battery cells 1 stacked in the vertical direction (the direction indicated by arrow C) can be about 2 layers. In some embodiments, the number of layers of battery cells 1 stacked in the vertical direction can be about 1 to 5 layers. In some embodiments, the number of layers of battery cells 1 stacked in the vertical direction can be about two layers or three layers.

In order to better balance the expansion force of battery module 100 in the horizontal direction and that in the vertical direction, in some embodiments, the ratio of the dimension of battery module 100 in the horizontal direction to the dimension of battery module 100 in the vertical direction can be greater than or equal to about one, two, three, or four. In some embodiments, the ratio of the dimension of battery module 100 in the horizontal direction to the dimension of battery module 100 in the vertical direction can be greater than or equal to about four.

Battery cell 1 may generate gas inside battery case 12 during the processes of charging and discharging, the generated gas exerts a force on battery case 12, which further aggravates the outward expansion of battery case 12. Since the area of first surface 110 in some embodiments of the present disclosure can be larger than the area of second surface 120, and the two first surfaces 110 of battery cells 1 can face each other in the vertical direction, the direction in which the generated gas exerts the largest force on battery case 12 can be also in the vertical direction. Accordingly, the largest expansion force of battery module 100 can be further reduced.

In the conventional technology, due to the structural limitation of the vehicle chassis, for the vehicle chassis that is used for accommodating the battery pack, the dimension in the vertical direction is much smaller than the dimension in the width direction or the dimension in the horizontal dimension. In some embodiments of the present disclosure, second surface 120 of battery cell 1 can face toward the vertical direction (the direction indicated by arrow C), thus the original dimension of battery cell 1 in the vertical direction is changed to the current dimension in the width direction (the direction indicated by arrow B). As a result, in the case of the same battery cell 1, the dimension of the battery pack in the vertical direction of the vehicle chassis is reduced, and the space of the chassis of a vehicle in the width direction and in the horizontal direction are better utilized, which is more in line with the demand for the battery pack of a new energy vehicle.

FIG. 8 shows first electrode terminal 131 and second electrode terminal 132 on battery cell 1 can be disposed on first surface 110 of battery case 12, according to some embodiments of the present disclosure, such that bus bar 5 connected to the electrode terminals can be located on one side of battery cell 1 where first surface 110 is located. Since the space of battery module 100 in the vertical direction is more valuable than the space in other directions, the arrangement of the bus bar on one side of first surface 110 can allow better utilization of the space on the side of battery module 100, thereby reducing the dimension of battery module 100 in the vertical direction. In particular, when battery module 100 is applied in a vehicle, battery module 100 is usually disposed at the bottom of the vehicle, by means of reducing the dimension of battery module 100 in the vertical direction, the ground clearance of the bottom of the vehicle can be increased, which helps to improve the vehicle's capacity to overcome obstacles.

Figure 13:
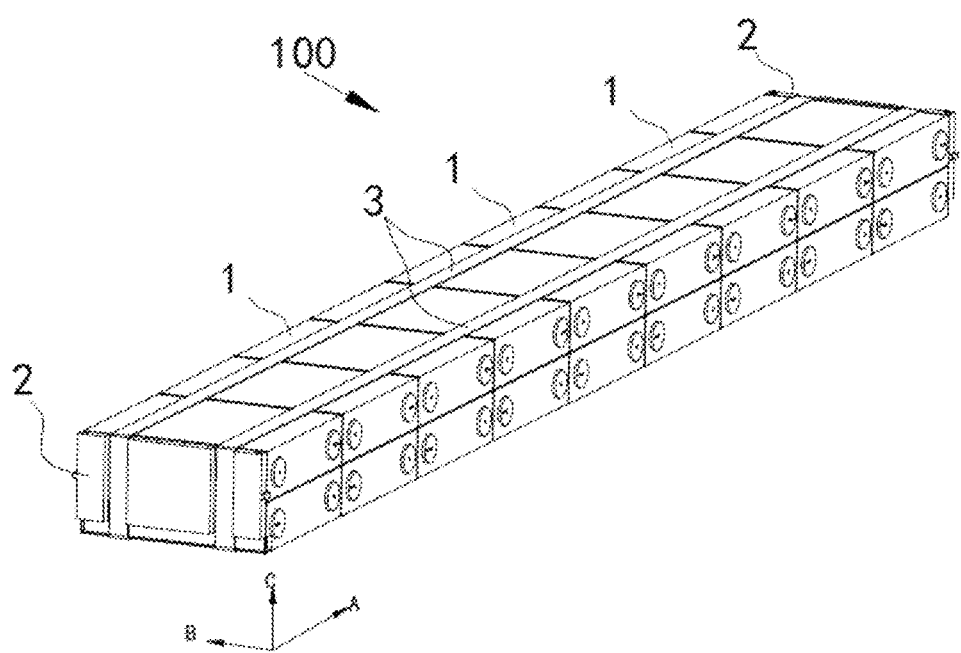
FIG. 13 is a schematic structural view of a battery module, according to some embodiments of the present disclosure.
Figure 14:
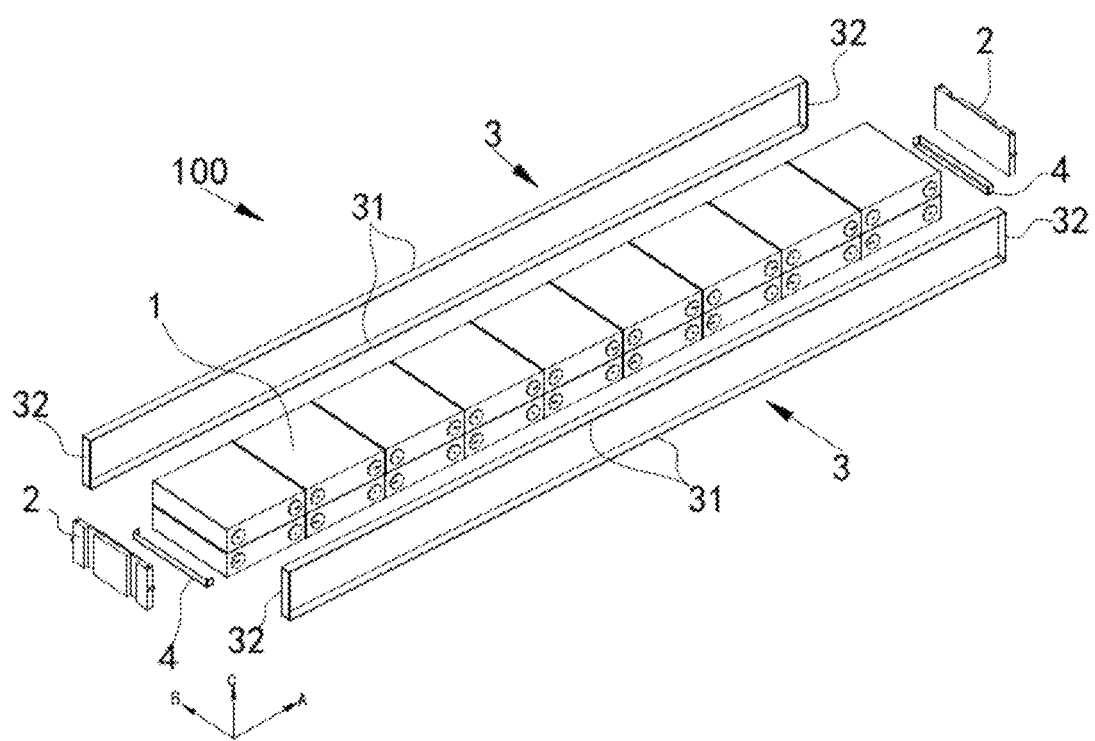
FIG. 14 is an exploded view of the battery module, according to some embodiments shown in FIG. 13.

FIGS. 13 and 14 show battery module 100 can include a tying band 3, according to some embodiments of the present disclosure. Tying band 3 can surround the outer periphery of a plurality of battery cells 1, and can be head to tail connected by itself, such that the plurality of battery cells are tied together. Tying band 3 can be made of a material including, but not limited to, nylon, polypropylene and polyvinyl chloride, which can have good flexibility. In addition, the tying band can surround the plurality of battery cells 1 to form two long sides 31 and two short sides 32. In some embodiments, long side 31 and first surface 110 can face each other and extend in the horizontal direction (the length direction indicated by arrow A), and short side 32 and second surface 120 can face each other and extend in the vertical direction (the direction indicated by arrow C). Since the expansion force of battery module 100 in the horizontal direction (for example, the length direction indicated by arrow A) is relatively small, the strength requirement for the fixed structure of the battery cell 1 is accordingly lowered. Thus, battery cells 1 in battery module 100 can be bundled together with tying band 3. In some embodiments, battery module 100 can be secured by other means including, but not limited to a pressure bar, a side plate, and a bolt. In some embodiments, tying band 3 has the advantages of light weight, small occupation size, and so on. Using tying band 3 to bundle the periphery of battery cells 1 can reduce the weight of battery module 100.

Optionally, battery module 100 can be provided with at least two tying bands 3, and tying bands 3 can be spaced apart in the width direction (the direction indicated by arrow B). In some embodiments, the number of tying bands 3 can be one. In some embodiments, the number of tying bands 3 can be three, four, or five.

FIGS. 13 and 14 show battery module 100 with two end plates 2, according to some embodiments of the present disclosure. End plates 2 can be respectively disposed at two ends in the horizontal direction of the plurality of battery cells 1 (for example, the length direction indicated by arrow A). Tying band 3 can surround the outer periphery of the plurality of battery cells 1 and the two end plates 2, so as to tie the two end plates 2 and the plurality of battery cells 1 together. End plate 2 can be made of a metal material or non-mental material. Exemplary materials can include, but not limited to, aluminum or aluminum alloy, and a polymer material such as plastic through an injection molding process.

FIG. 14 shows battery module 100 with an insulation part 4, according to some embodiments of the present disclosure. Insulation part 4 can be made of an insulating materials including, but not limited to, rubber and silicone. Insulation part 4 can include at least a first surface and a second surface, wherein the first surface can be perpendicular to the second surface. Insulation part 4 can be arranged at the bottom of both ends of battery module 100 in the length direction, the first surface of the insulation part 4 can be opposed to a side surface of battery cell 1 at one end, and the second surface of insulation part 4 can be opposed to the bottom surface of battery cell 1. Tying band 3 can surround the outer periphery of end plates 2, the plurality of battery cells 1 and the two insulation parts 4, such that end plates 2, battery cells 1, and insulation part 4 are bonded together. Insulation part 4 not only functions for insulation protection, but also prevents battery cell 1 from being locally tightened by tying band 3, in which uneven forces may be applied on the battery cell.

Figure 15:
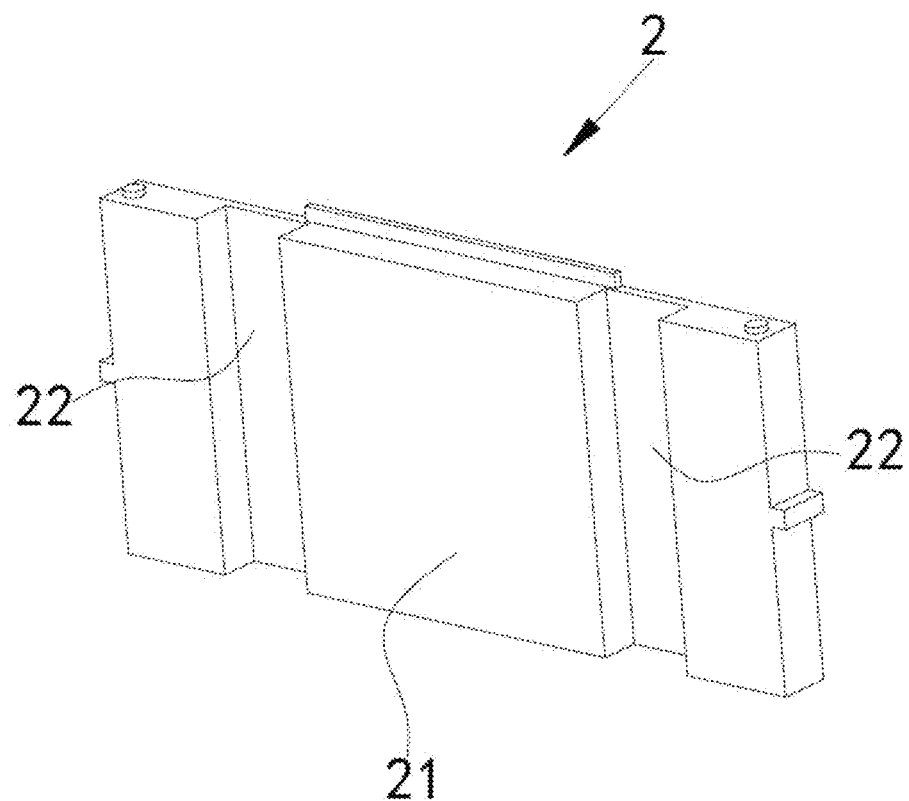
FIG. 15 is a schematic structural view of an end plate, according to some embodiments of the present disclosure.

FIG. 15 is a schematic structural view of end plate 2, according to some embodiments of the present disclosure. End plate 2 can include a main body 21 of end plate and a tying band limiting slot 22, wherein tying band limiting slot 22 can be disposed at the outer surface of end plate 2, and can be formed by means of the outer surface of end plate 2 recessing inward. Tying band limiting slot 22 can extend in the vertical direction. Tying band 3 can pass through tying band limiting slot 22 such that short side 32 of tying band 3 can be received in tying band limiting slot 22. Tying band 3 can surround the outer periphery of the plurality of battery cells 1 and end plates 2, wherein the width of tying band limiting slot 22 can be equivalent to the width of short side 32 of tying band 3, such that the position of tying band 3 can be defined.

While the disclosure has been described in connection with certain embodiments, it is to be understood that the disclosure is not to be limited to the disclosed embodiments but, on the contrary, is intended to cover various modifications and equivalent arrangements included within the spirit and scope of the disclosure, which scope is to be accorded the broadest interpretation so as to encompass all such modifications and equivalent structures as is permitted under the law.

What is claimed is:

1. A battery pack, comprising:
    a box body forming an accommodating chamber; and
    a plurality of battery modules disposed in the accommodating chamber and arranged in a horizontal direction,
        a first battery module of the battery modules located at one end of the battery pack in the horizontal direction and a second battery module of the battery modules located at another end of the battery pack in the horizontal direction;
        the battery modules each comprising:
            a plurality of first bus bars; and
            a plurality of battery cells electrically connected to each other by the plurality of first bus bars,
            wherein each battery cell comprises a battery case, a first electrode terminal and a second electrode terminal, the battery case comprising a first surface and a fourth surface facing the first surface, and the first electrode terminal and the second electrode terminal are both disposed on the first surface of the battery case,
    wherein a number of the plurality of battery modules is an odd number, the first surface of one of the battery modules and the fourth face of another one of the battery modules face each other, the other battery modules except one designated battery module is defined as a battery module assembly, and for any two adjacent battery modules of the battery module assembly, the first surface of one battery module and the first surface of the other battery module face each other, or the fourth surface of one battery module and the fourth surface of the other battery module face each other.

2. The battery pack according to claim 1, wherein a dimension of the battery case in a horizontal direction is larger than a dimension of the battery case in a vertical direction.

3. The battery pack according to claim 1, wherein the battery case comprises two second surfaces and two third surfaces, an area of the second surface is larger than an area of the first surface and larger than an area of the third surface, the two second surfaces face each other in a vertical direction, the two third surfaces face each other in a horizontal direction, and any two of the first surfaces, the second surfaces, and the third surfaces are connected to each other.

4. The battery pack according to claim 1, wherein
    the horizontal direction is a width direction of the battery pack, or
    the horizontal direction is a length direction of the battery pack.

5. The battery pack according to claim 1, wherein a partition plate is disposed between the two adjacent battery modules.

6. The battery pack according to claim 1, wherein the plurality of battery modules are electrically connected to each other by a plurality of second bus bars, and wherein the plurality of second bus bars are located at the same end of the plurality of battery modules.

7. The battery pack according to claim 1, wherein the battery module comprises a tying band surrounding an outer periphery of the plurality of battery cells, the tying band comprises a long side and a short side, the long side faces a top surface of the battery module or a bottom surface of the battery module and extends in the horizontal direction, and the short side faces a side surface of the battery module and extends in the vertical direction.

8. The battery pack according to claim 6, wherein the battery module comprises two end plates respectively disposed at two ends of the plurality of battery cells, and the tying band surrounds the outer periphery of the plurality of battery cells and the two end plates.

9. The battery pack according to claim 1, comprising two or three battery cells stacked in a vertical direction in the battery module.

10. A vehicle, comprising:
    a vehicle body; and
    a battery pack according to claim 1 disposed at a bottom of the vehicle body, wherein
    the first battery module and the second battery module in the battery pack are respectively arranged on two sides in a width direction of the vehicle body; or,
    the first battery module and the second battery module in the battery pack are respectively arranged on two sides in a length direction of the vehicle body.

11. The battery pack according to claim 1, wherein each battery cell comprises an electrode assembly accommodated in the battery case.

12. The battery pack according to claim 11, wherein the electrode assembly comprises a first electrode sheet, a second electrode sheet, and a separator disposed between the first electrode sheet and the second electrode sheet.

13. The battery pack according to claim 12, wherein the first electrode sheet, the second electrode sheet, and the separator are stacked in a vertical direction.

14. The battery pack according to claim 11, wherein the electrode assembly has a wound structure or a laminated structure.

15. The battery pack according to claim 7, wherein the battery module comprises two tying bands, and the two typing bands are spaced apart.

16. The battery pack according to claim 7, wherein the tying band is connected head to tail by itself.

* * * * *